United States Patent [19]
McMinn

[11] Patent Number: 6,097,403
[45] Date of Patent: *Aug. 1, 2000

[54] MEMORY INCLUDING LOGIC FOR OPERATING UPON GRAPHICS PRIMITIVES

[75] Inventor: Brian D. McMinn, Buda, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/033,178

[22] Filed: Mar. 2, 1998

[51] Int. Cl.[7] .................................................. G06F 15/76
[52] U.S. Cl. ........................... 345/519; 345/520; 345/509
[58] Field of Search .................................... 345/507–509, 345/519, 513, 522, 501–503, 520, 521, 515

[56] References Cited

U.S. PATENT DOCUMENTS

| | | | |
|---|---|---|---|
| 4,590,465 | 5/1986 | Fuchs | 345/509 |
| 4,783,649 | 11/1988 | Fuchs et al. | 345/509 |
| 5,184,325 | 2/1993 | Lipovski | 365/189.07 |
| 5,579,450 | 11/1996 | Hanyu et al. | 345/428 |
| 5,796,413 | 8/1998 | Shipp et al. | 345/522 |
| 5,867,180 | 2/1999 | Katayama et al. | 345/512 |
| 5,877,779 | 3/1999 | Goldberg et al. | 345/511 |
| 5,909,559 | 6/1999 | So | 710/127 |

OTHER PUBLICATIONS

Luk et al Development of a high bandwidth merged logic/DRAM multimedia chip, IEEE Computer Society, Proceedings on ICCD'97, Oct. 12–15, 1997, pp. 279–185.

Mitsubishi, Electronic Device Group, Preliminary Rev. 0.95, 3D–RAM (M5M410092B), pp. 2–191.

ICCD, 1997, International Conference on Computer Design, "Intelligent RAM (IRAM): the Industrial Setting, Applications, and Architectures," Oct. 10–12, 1997, 6 pages.

A Case for Intelligent RAM: IRAM, Patterson, et al., Computer Science Division/EECS Dept., University of CA, Berkeley, CA, Feb. 10, 1997, pp. 1–23.

*Primary Examiner*—Kee M. Tung
*Attorney, Agent, or Firm*—Conley, Rose & Tayon, P.C.; Lawrence J. Merkel

[57] ABSTRACT

A main memory comprises one or more memory devices which include logic for performing a predetermined graphics operation upon graphics primitives stored therein. The microprocessor(s) within the computer system may direct the memory to perform the predetermined operation upon the graphics primitives instead of performing the operation within the microprocessor(s). If the graphics primitives are stored into multiple memory devices, each memory device operates upon the graphics primitives stored within that memory device in parallel with the other memory device's operation. Accordingly, the bandwidth is a linear factor of the number of memory devices storing graphics primitives. In one embodiment, each memory device iteratively performs the predetermined operation upon the set of graphics primitives stored in that memory device. Because the memory device is iterative, logic for performing the predetermined graphics operation upon one graphics primitive at a time may be employed. The memory devices are also operable as passive memory devices if no graphics primitives are stored therein. Accordingly, at times in which video processing is not being performed, the memory devices may be used to store instructions or other data.

19 Claims, 4 Drawing Sheets

MEMORY INCLUDING LOGIC FOR OPERATING UPON GRAPHICS PRIMITIVES

BACKGROUND OF THE INVENTION

1. Field of the Invention

This invention is related to the field of computer systems and, more particularly, to graphics features of the computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modem DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the effective memory latency. Cache misses require the access to receive data from the main memory, thereby increasing the effective memory latency.

The microprocessor is typically configured to operate upon a variety of data types, many of which are cached to reduce the memory latency of access to those data types. Unfortunately, certain data types are typically operated upon in a manner which may increase average effective memory latency. For example, graphics data and operation thereon by the microprocessor may deleteriously affect memory latency in several ways. Generally, a relatively large amount of graphics data (in comparison to the amount of available cache storage) is operated upon in a repetitive fashion by the microprocessor, and then transferred to a graphics controller for display upon a computer monitor. Like other data operated upon by the microprocessor, the graphics data may be transferred into the data cache within the microprocessor as it is being operated upon. The graphics data thereby displaces other data stored in the cache. Additionally, since the data is repeatedly transmitted between the microprocessor and the graphics controller (or memory, since the graphics image typically may be substantially larger than the cache and hence operation on one portion of the image displaces another portion of the image within the cache) as various changes to the display are performed, a large amount bandwidth is consumed for the transfer of graphics data. If the consumption of bandwidth in this fashion interferes with the transfer of other types of data, memory latency may be lengthened by the lack of available bandwidth for transfer of that other data. Accordingly, it is desirable to reduce the number of times the graphics data is transferred into and out of the microprocessor.

SUMMARY OF THE INVENTION

The problems outlined above are in large part solved by a computer system employing a main memory in accordance with the present invention. The main memory described herein comprises one or more memory devices which include logic for performing a predetermined graphics operation upon graphics primitives stored therein. The microprocessor(s) within the computer system may direct the memory to perform the predetermined operation upon the graphics primitives instead of performing the operation within the microprocessor(s). Advantageously, bandwidth required for transferring the graphics primitives to and from the microprocessor is not consumed. The bandwidth may be available for performing other memory operations, and may thereby reduce the average memory latency experienced by the other memory operations. Performance may be increased due to the reduction of average memory latency.

Additionally, the bandwidth available with the memory devices may be quite large. If the graphics primitives are stored into multiple memory devices, each memory device operates upon the graphics primitives stored within that memory device in parallel with the other memory device's operation. Accordingly, the bandwidth is a linear factor of the number of memory devices storing graphics primitives. In one embodiment, each memory device iteratively performs the predetermined operation upon the set of graphics primitives stored in that memory device. Because the memory device is iterative, logic for performing the predetermined graphics operation upon one graphics primitive at a time may be employed. Accordingly, a relatively small amount of logic (as compared to logic for performing the operation in parallel upon all of the graphics primitives stored in that memory device) may be employed while still achieving high bandwidth (and hence processing efficiency).

Furthermore, the memory devices described herein are also operable as passive memory devices if no graphics primitives are stored therein. Accordingly, at times in which video processing is not being performed, the memory devices may be used to store instructions or other data.

Broadly speaking, the present invention contemplates a memory comprising a memory array and a graphics primitive logic. The memory array is provided for storing data. Coupled to the memory array, the graphics primitive logic is configured to perform a predetermined operation upon a plurality of graphics primitives stored in the memory array. Additionally, the graphics primitive logic is configured to iteratively perform the predetermined operation upon the plurality of graphics primitives responsive to a command receivable by the memory.

The present invention further contemplates a method for performing a predetermined operation upon a plurality of graphics primitives in a computer system. The plurality of graphics primitives are stored into a memory including a graphics primitive logic. A command is transmitted to the memory subsequent to the storing. Responsive to the command, the predetermined operation is iteratively performed upon the plurality of graphics primitives by the graphics primitive logic.

Moreover, the present invention contemplates a computer system comprising a microprocessor, a bus bridge, and a memory. The bus bridge is coupled to the microprocessor. The memory includes an integrated graphics primitive logic configured to perform a predetermined operation upon a plurality of graphics primitives stored in the memory. Additionally, the graphics primitive logic is configured to iteratively perform the predetermined operation upon the plurality of graphics primitives responsive to a command conveyed by the microprocessor subsequent to the microprocessor storing the plurality of graphics primitives into the memory.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
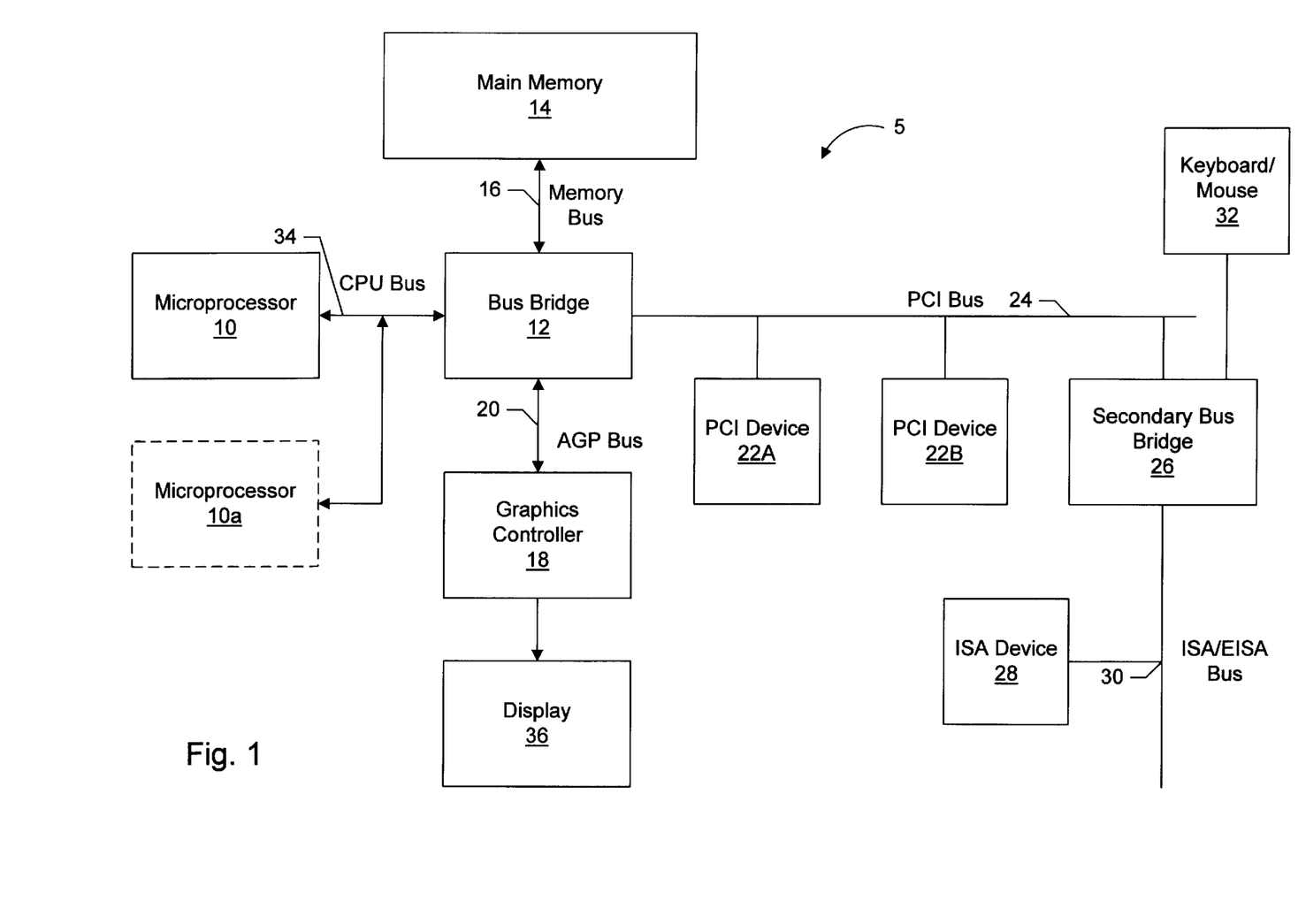
FIG. 1 is a block diagram of one embodiment of a computer system.

Turning now to FIG. 1, a block diagram of one embodiment of a computer system 5 including a microprocessor 10 coupled to a variety of system components through a bus bridge 12 is shown. Other embodiments are possible and contemplated. In the depicted system, a main memory 14 is coupled to bus bridge 12 through a memory bus 16, and a graphics controller 18 is coupled to bus bridge 12 through an AGP bus 20. Finally, a plurality of PCI devices 22A–22B are coupled to bus bridge 12 through a PCI bus 24. A secondary bus bridge 26 may further be provided to accommodate an electrical interface to one or more EISA or ISA devices 28 through an EISA/ISA bus 30. Microprocessor 10 is coupled to bus bridge 12 through a CPU bus 34.

Generally speaking, main memory 14 includes one or more memory devices configured to store data and further configured to perform one or more graphics operations upon graphics primitives stored therein. The memory devices may be used as passive memory storage if the data stored therein does not represent graphics primitives. On the other hand, if the data stored therein does represent graphics primitives, specialized logic included in the memory devices may be activated. A predetermined graphics operation may be performed on the graphics primitives, thereby producing a desired graphics transformation. Because each memory device operates in parallel upon the data stored therein, the effective bandwidth available for performing the predetermined graphics operation may be substantially larger than the bandwidth available upon memory bus 16 and/or CPU bus 34. Advantageously, a relatively large video image may be processed more efficiently by performing the predetermined graphics operation upon the graphics primitives stored in main memory 14 than may be achieved by performing the same graphics operation via microprocessors 10 and/or 10a. Additionally, this higher efficiency processing of graphics images may be accomplished by adding relatively small, simple hardware to each memory device.

As used herein, the term "graphics primitive" refers to a set of values which represents an object to be displayed upon a video display device such as display 36. For example, a typical graphics primitive may comprise a triangle represented by the three vertices of the triangle. More complex objects may be represented using multiple triangles. As yet another example, a pixel map (in which each pixel on the screen of the video display device is directly represented by a corresponding entry within the map) may be a graphics primitive. Since the pixel map represents each pixel to be displayed and the number of pixels is generally large (in the 100,000's, for many modern displays), the pixel map may require a substantial amount of bandwidth to be transferred to and from, e.g., microprocessor 10 or 10a. Additionally, the term "graphics operation" refers to an operation performed upon video data in order to transform the data into a format which results in a more desirable display upon display 36. For example, graphics controller 18 may comprise a frame buffer, and the format provided to graphics controller 18 comprises a list of pixels. Alternatively, graphics controller 18 may be configured to perform certain rendering operations, and format provided to graphics controller 18 comprises a set of graphics primitives. Even if graphics controller 18 is configured to perform certain rendering operations, rough video data may be operated upon within main memory 14 to transform the graphics primitives represented within the rough video data into a set of graphics primitives desirable for display. For example, operations such as anti-aliasing or shading may be performed upon the rough video data within main memory 14. As used herein, the term "anti-aliasing" refers to removing the effects of digitization upon the graphics primitives. Digitized graphics primitives often times have jagged edges, as opposed to the smooth edges actually indicative of the object being displayed. During anti-aliasing, the digitized graphics primitive is processed to remove the jagged edge. Several well-known algorithms may be suitable for use in the memory devices for performing anti-aliasing. Shading refers to darkening or lightening portions of an object within an image to reflect a particular light source and other objects within the image.

Microprocessors 10 and/or 10a may be configured to transmit specialized commands upon CPU bus 34 to bus bridge 12 in order to cause main memory 14 to perform the predetermined graphics operations. A code sequence operating upon microprocessor 10 and/or 10a may store video data into main memory 14, then execute one or more specialized commands to: (i) provide information locating the video data within the memory devices; and (ii) instruct the memory devices to perform the desired predetermined operation. The specialized commands may be conveyed upon CPU bus 34 using different encodings upon the control portion of CPU bus 34, a signal added to the signals defined by a bus protocol employed upon CPU bus 34 (a "sideband signal"), or may be identified via a predetermined address transmitted as part of a typical read or write operation. Bus bridge 12, upon receiving a specialized command, is configured to relay the command upon memory bus 16 to main memory 14. In one embodiment, memory bus 16 includes a standard control signal set provided to memory devices of the type employed by main memory 14, as well as a logic command signal indicating that a logic command is being conveyed upon memory bus 16 as opposed to a read or write request. The logic command may be configuration data identifying which memory devices are storing video data (and which portion of the memory within the memory device or devices), or the configuration data may identify the desired predetermined operation (if the memory devices are configured to perform more than one memory operation). Alternatively, the logic command may initiate the predetermined operation. For example, the various logic commands may be specified using different addresses upon the address portion of memory bus 16 in conjunction with an assertion of the logic command signal.

Accordingly, the CPU bus bandwidth consumed in order to perform a desired graphics operation upon a graphics may be reduced from multiple transfers of the graphics data into microprocessor 10 and/or 10a to one or more commands to main memory 14 to initialize main memory 14 and a command to perform the operation. The CPU bus bandwidth made available via reducing graphics data bandwidth may be used to transfer instructions and/or non-graphics data into microprocessor 10 and/or 10a. Furthermore, more non-graphics data may be retained within caches internal to the microprocessors than would be achievable in the absence of a main memory configured in the manner of main memory 14. Still further, the memory devices included in main memory 14 operate as passive memory if video data is not stored therein.

In one embodiment, each memory device within main memory 14 is configured to iteratively perform the predetermined graphics operation upon each of the graphics primitives stored therein. In other words, the predetermined graphics operation is performed upon a first graphics primitive, then subsequently upon a second graphics primitive, then still subsequently upon a third graphics primitive, etc. By performing the predetermined graphics operation iteratively, the logic added to the memory devices to perform the predetermined graphics operation may be substantially smaller (in terms of number of logic gates, integrated circuit area consumed within the memory devices, etc.) than an implementation which performs the predetermined graphics operation in parallel upon the various graphics primitives stored within a particular memory device.

It is noted that, although the present discussion refers to operating upon video data, embodiments of memory devices which are configured to perform other predetermined operations are contemplated as well. For example, memory devices configured to perform audio processing are contemplated. The memory devices may be configured to perform, for example, discrete Fourier transform operations upon the audio data.

Bus bridge 12 provides an interface between microprocessor 10, main memory 14, graphics controller 18, and devices attached to PCI bus 24. When an operation is received from one of the devices connected to bus bridge 12, bus bridge 12 identifies the target of the operation (e.g. a particular device or, in the case of PCI bus 24, that the target is on PCI bus 24). Bus bridge 12 routes the operation to the targeted device. Bus bridge 12 generally translates an operation from the protocol used by the source device or bus to the protocol used by the target device or bus.

In addition to providing an interface to an ISA/EISA bus for PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired. An external cache unit (not shown) may further be coupled to CPU bus 34 between microprocessor 10 and bus bridge 12 in other embodiments. Alternatively, the external cache may be coupled to bus bridge 12 and cache control logic for the external cache may be integrated into bus bridge 12.

Main memory 14 is a memory in which application programs are stored and from which microprocessor 10 primarily executes. A suitable main memory 14 comprises DRAM (Dynamic Random Access Memory), and preferably a plurality of banks of SDRAM (Synchronous DRAM). As mentioned above, main memory 14 comprises graphics primitive logic for performing a predetermined graphics operation upon the graphics primitives stored therein.

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14.

Graphics controller 18 may therefore be a master of AGP bus 20 in that it can request and receive access to a target interface within bus bridge 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of bus bridge 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 5 may be a multiprocessing computer system including additional microprocessors (e.g. microprocessor 10a shown as an optional component of computer system 5). Microprocessor 10a may be similar to microprocessor 10. More particularly, microprocessor 10a may be an identical copy of microprocessor 10. Microprocessor 10a may share CPU bus 34 with microprocessor 10 (as shown in FIG. 1) or may be connected to bus bridge 12 via an independent bus.

Figure 2:
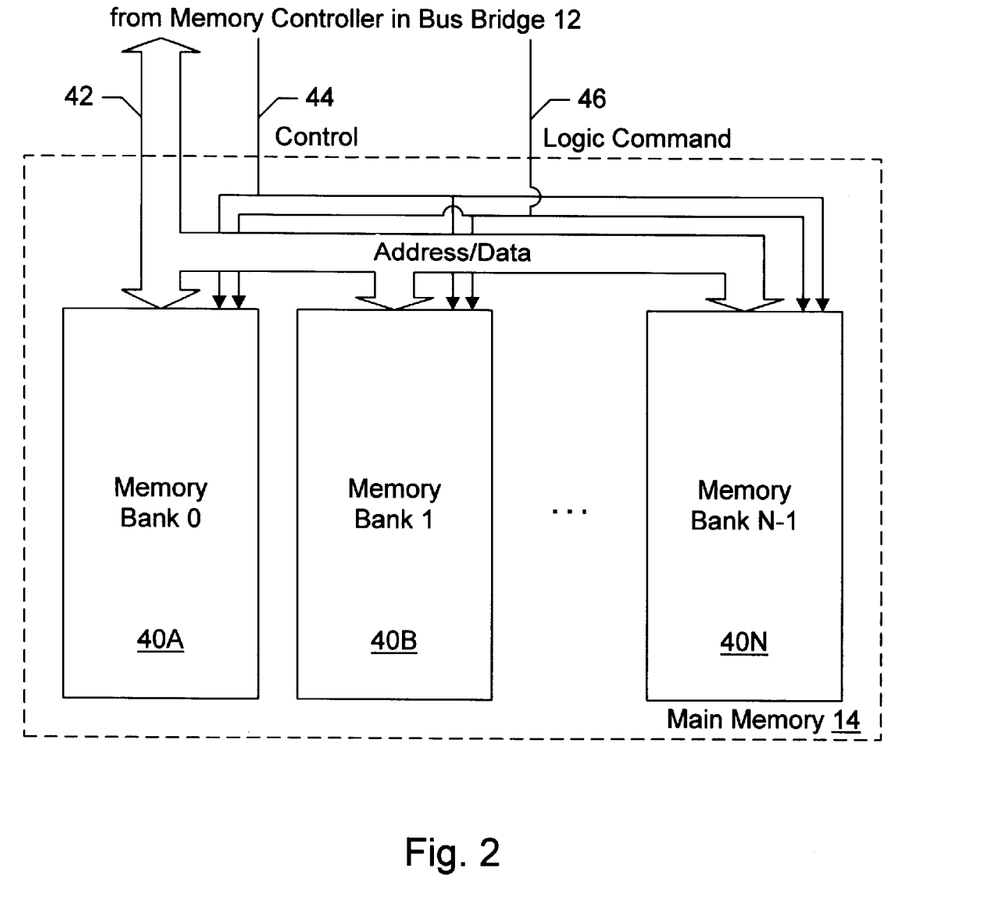
FIG. 2 is a block diagram of one embodiment of a main memory shown in FIG. 1.

Turning now to FIG. 2, a block diagram of one embodiment of main memory 14 is shown. Other embodiments are possible and contemplated. In the embodiment shown in FIG. 2, main memory 14 comprises a plurality of memory banks 40A–40N. Each of memory banks 40A–40N is coupled to an address/data bus 42, a control bus 44, and a logic command line 46. Each of address/data bus 42, control bus 44, and logic command line 46 is also coupled to bus bridge 12. More particularly, address/data bus 42, control bus 44, and logic command line 46 are coupled to a memory controller included in bus bridge 12. In order to perform memory read and write operations, the memory controller is configured to: (i) transmit addresses upon address/data bus 42 and corresponding control information upon control bus 44; and (ii) transmit or receive data upon address/data bus 42.

The configuration of address/data bus 42 and control bus 44 depends upon the type of memory devices included in memory banks 40A–40N. For example, memory banks 40A–40N may comprise asynchronous dynamic random access memories (DRAMs). The standard control signal set for asynchronous DRAMs includes a row address strobe signal, a column address strobe signal, a write enable signal, and a bank select signal. Additionally, address/data bus 42 includes separate address and data portions. A location within a memory device is selected by providing a row address upon the address portion of address/data bus 42 in conjunction with the assertion of the row address strobe signal, and subsequently providing a column address upon the address portion of address/data bus 42 in conjunction with the assertion of the column address strobe signal. If the memory operation being performed is a write, the write enable signal is asserted and the memory controller provides data upon the data portion of address/data bus 42. Alternatively, if the memory operation being performed is a read, the write enable signal is deasserted and the memory devices provide data upon the data portion of address/data bus 42. The bank select signal serves as an enable for the memory devices, such that only one of memory banks 40A–40N responds to a given transfer. A different bank select signal may be provided to each of memory banks 40A–40N. Synchronous dynamic random access memories (SDRAMs) may employ a similar standard control signal set with different timing characteristics. More particularly, a clock signal may be added to the standard control signal set, and the other signals within the standard control signal set may be referenced to the clock signal. Similarly, the address and data lines comprising address/data bus 42 may be referenced to the clock signal. Other types of memory devices may employ different standard control signal sets as desired.

As used herein, the term "standard control signal set" refers to a set of control signals defined to control read and write access to a memory device. The memory devices described herein include the functionality of a memory device as well as additional logic for performing the predetermined graphics operation. Accordingly, the memory devices described herein employed the standard control signal set corresponding to that type of memory device. In addition, the memory devices employ the logic command signal for controlling the predetermined graphics operation.

Figure 4:
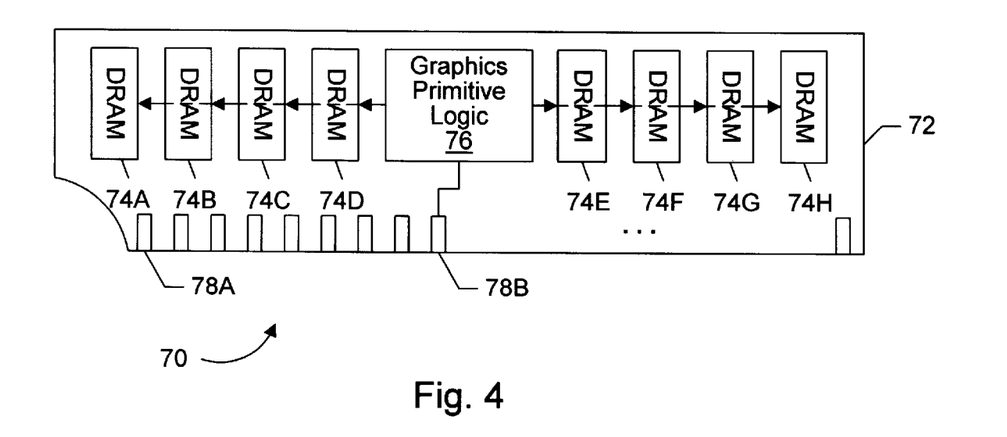
FIG. 4 is a block diagram of one embodiment of a SIMM module.

Each memory bank 40A–40N includes at least one memory device, and may include multiple memory devices coupled in parallel to provide a wider data portion of address/data bus 42. In one particular embodiment, a memory bank may comprise a single inline memory module (SIMM) as shown in FIG. 4.

Figure 3:
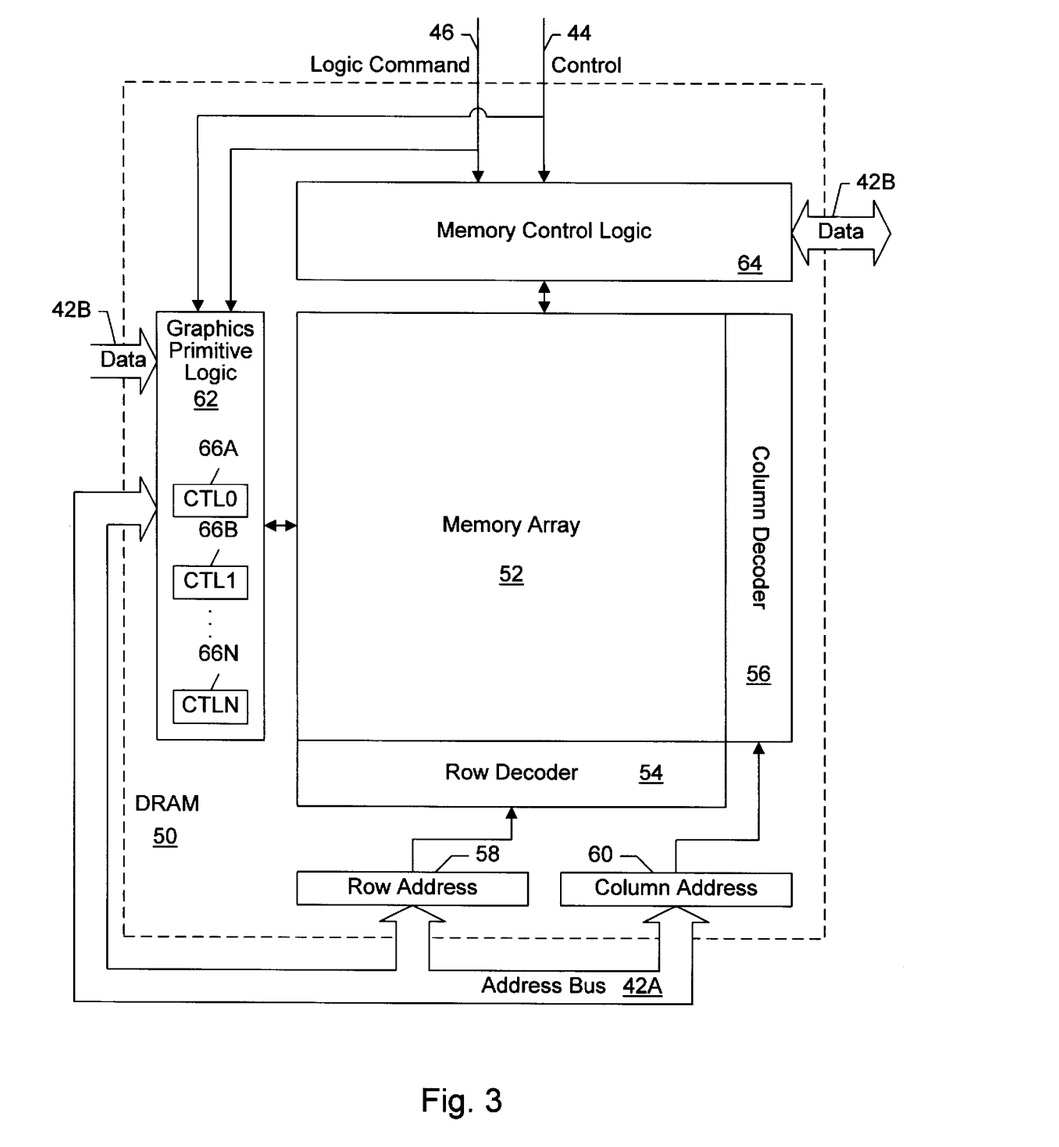
FIG. 3 is a block diagram of one embodiment of a DRAM module.

Turning now to FIG. 3, a block diagram of one embodiment of a memory device 50 is shown. Other embodiments are possible and contemplated. As shown in FIG. 3, memory device 50 comprises a dynamic random access memory ("DRAM"—either asynchronous or synchronous). Other types of dynamic random access memories, for example, RAMBUS dynamic random access memory, are contemplated. Furthermore, any suitable memory may be employed in other contemplated embodiments.

Memory device 50 includes a memory array 52, a row decoder 54, a column decoder 56, a row address register 58, a column address register 60, a graphics primitive logic block 62, and a memory control logic block 64. Address bus 42A (the address portion of address/data bus 42) is coupled to row address register 58, column address register 60, and graphics primitive logic block 62. Data bus 42B (the data portion of address/data bus 42) is coupled to memory control logic block 64 and graphics primitive logic block 62. Similarly, control bus 44 and logic command line 46 are coupled to memory control logic block 64 and graphics primitive logic block 62. Row address register 58 is coupled to row decoder 54, and column address register 68 is similarly coupled to column decoder 56. Both graphics primitive logic block 62 and memory control logic block 64 are coupled to memory array 52. Row address register 58 and column address register 60 are coupled to memory control logic block 64 (not shown for clarity in the drawing).

Memory array 52 is arranged as a set of rows and columns of storage locations for storing data. A particular row is selected by row decoder 54 responsive to an address stored in row address register 58. A column within the particular row is selected responsive to a column address stored in column address register 60 by column decoder 56. If the operation being performed is a read operation, data from the selected storage location is transferred to memory control logic block 64. Alternatively, responsive to a write operation, data received upon data bus 42B is stored into the selected storage location. Generally, row address register 58 receives the value upon address bus 42A upon assertion of the row address strobe signal received by memory control logic block 64. Similarly, column address register 60 receives the value upon address bus 42A upon assertion of the column address strobe signal received by memory control logic block 64.

Memory control logic block 64 receives control bus 44 and controls other elements of memory device 50 responsive to the control signals. Memory control logic block 64 are also receives logic command line 46, and if the logic command signal transmitted thereon is asserted, memory control logic block 64 inhibits responsiveness to the control signals. On the other hand, graphics primitive logic block 62 inhibits responsiveness to control signals upon control bus 44 and values upon address bus 42A and data bus 42B if the logic command signal is deasserted and is responsive to the control signals and values if the logic command signal is asserted.

Graphics primitive logic block 62 is configured to perform a predetermined graphics operation upon graphics primitives stored in memory array 52. More particularly, graphics primitive logic block 62 iteratively reads graphics primitives from memory array 52, performs the predetermined graphics operation upon the graphics primitive, and stores the result back into memory array 52 until each graphics primitive stored within memory array 52 has been processed. As mentioned above, graphics primitive logic block 62 may be configured to receive information indicating which portions of memory array 52 are storing graphics primitives, as well as other control information, prior to receiving a command to perform the predetermined graphics operation. Accordingly, graphics primitive logic 62, as shown in FIG. 3, includes a plurality of control registers 66A–66N. Control registers 66A–66N may store an indication of a range of storage locations within memory array 52 which are storing graphics primitives. Furthermore, control registers 66A–66N may store an indication of a selected one of several predetermined graphics operations which graphics primitive logic block 62 is configured to perform. The selected predetermined graphics operation is the desired predetermined graphics operation to be performed upon the graphics primitive stored within memory array 52.

Control registers 66A–66N may be programmed by performing write operations via control bus 44, address bus 42A, and data bus 42B using selected predetermined addresses and concurrently asserting the logic command signal upon logic command line 46. The data to be stored into the selected control registers 66A–66N may be transmitted upon data bus 42B. Each control register 66A–66N is assigned a different predetermined address, and yet another predetermined address indicates that graphics primitive logic block 62 is directed to begin performing the predetermined graphics operation upon the graphics primitives stored in memory array 52 according to the values stored in control registers 66A–66N. Accordingly, a series of write memory operations may be performed to program control registers 66A–66N, and then a write memory operation may be used to initiate graphics primitive logic block 62. If subsequent predetermined graphics operations can be performed using the same values in control registers 66A–66N, then a single write memory operation may be performed to initiate graphics primitive logic block 62 without modifying control registers 66A–66N.

Turning next to FIG. 4, a block diagram of one embodiment of a single inline memory module (SIMM) 70 is shown. Other embodiments are possible and contemplated. In the embodiment shown in FIG. 4, SIMM 70 comprises a printed circuit board 72 upon which a plurality of DRAM modules 74A–74H and graphics primitive logic module 76 are mounted. Multiple edge connectors (e.g. edge connectors 78A and 78B) are provided upon printed circuit board 72 for making electrical contact with a SIMM connector mounted upon a computer system printed circuit board to which other devices such as bus bridge 12, microprocessor 10, etc. are also mounted. A module may comprise an integrated circuit encased in a suitable integrated circuit package.

Graphics primitive logic module 76 may include logic similar to graphics primitive logic block 62. Graphics printed logic module 76 is coupled to each of DRAM modules 74A–74H, and is configured to read graphics primitives from the DRAM modules 74A–74H, perform a predetermined graphics operation upon the graphics primitives, and store the result into DRAM modules 74A–74H. Alternatively, graphics primitive logic module 76 may implement a portion of the logic similar to graphics primitive logic block 62, and the remaining portion may be implemented within each DRAM module 74A–74H. For example, graphics primitive logic module 76 may employ the configuration registers identifying which portions of DRAM modules 74A–74H are storing graphics primitives, etc., and logic for performing the predetermined graphics operation may be embedded within each DRAM module 74A–74H.

Graphics primitive logic module 76 is coupled to edge connector 78B as shown in FIG. 4. Edge connector 78B may be coupled to receive the logic command signal onto SIMM 70. The logic command signal, as described above, indicates that a particular read or write operation is a graphics command (either a read or write operation to one of the configuration registers or a command to initiate the predetermined graphics operation) when the logic command signal is asserted. Other edge connectors are coupled to each of DRAM modules 74A–74H, as well as to graphics primitive logic module 76 (connections not shown in FIG. 4 for clarity in the drawing). These other edge connectors may be used to transmit and/or receive the standard control signals used by DRAM modules 74A–74H. One or more of SIMMs 70 may comprise a memory bank (e.g. memory banks 40A–40N).

Figure 5:
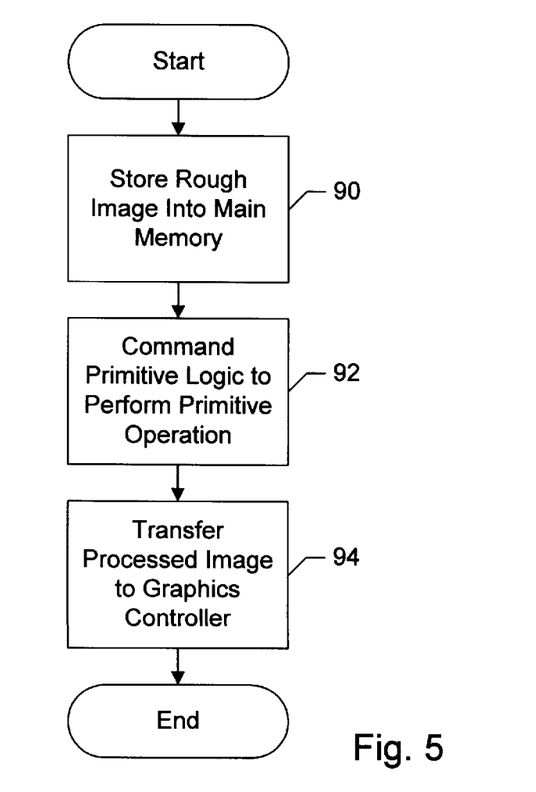
FIG. 5 is a flowchart illustrating operation of one embodiment of a microprocessor shown in FIG. 1 when processing graphics primitives in a computer system including one embodiment of memory having graphics primitive operation capabilities.

Turning next to FIG. 5, a flowchart is shown illustrating operation of one embodiment of a code sequence which may be executed by microprocessors 10 and/or 10a in computer system 5 employing memory devices which integrate graphics primitive logic block 62 and/or graphics primitive logic module 76. Other embodiments are possible and contemplated. While the steps shown in FIG. 5 are illustrated in serial order for ease of understanding, any suitable order may be used. Furthermore, steps may be implemented in parallel as desired.

A rough image represented as a set of graphics primitives are stored into main memory (step 90). Subsequently, a command is issued to the main memory to perform the predetermined graphics operation upon the graphics primitives stored therein (step 92). As mentioned above, the command may be a read or write operation for which the logic command signal is asserted. Additionally, optional configuration commands may be executed as part of step 92 or prior to step 92 or step 90. After the main memory has completed processing the set of graphics primitives comprising the rough image, thereby creating a processed image, the processed image is transferred to the graphics controller within the computer system for display upon a display coupled thereto (step 94).

It is noted that, although memory devices have been described above for use in main memory 14, similar memory devices may be employed within a video memory in graphics controller 18. In such an embodiment, the predetermined graphics commands are routed to graphics controller 18 for execution therein.

In accordance with the above disclosure, a computer system has been described which includes a memory system configured to perform a predetermined graphics operation upon graphics primitives stored therein. Advantageously, the operations may be performed upon the graphics primitives within the memory, allowing the CPU to operate upon other data in the caches and reducing the data bandwidth upon the CPU bus consumed by graphics data. Performance may be increased through the reduction in consumed bandwidth and through higher hit rates on non-graphics data in the caches.

Numerous variations and modifications will become apparent to those skilled in the art once the above disclosure is fully appreciated. It is intended that the following claims be interpreted to embrace all such variations and modifications.

What is claimed is:

1. A memory comprising:
    a plurality of memory banks, wherein each of said plurality of memory banks comprises:
        a memory array for storing data;
        a graphics primitive logic coupled to said memory array, said graphics primitive logic configured to perform a predetermined operation upon a plurality of graphics primitives stored in said memory array, said graphics primitive logic configured to iteratively perform said predetermined operation upon said plurality of graphics primitives responsive to a command receivable by said memory bank; and
        wherein each of said plurality of memory banks is coupled to a plurality of conductors, wherein one of the plurality of conductors conveys a logic command signal indicative of said predetermined graphics operation in addition to a standard dynamic random access memory control signal set.

2. The memory as recited in claim 1 wherein said memory array and said graphics primitive logic are integrated onto a single integrated circuit.

3. The memory as recited in claim 2 wherein said single integrated circuit comprises a dynamic random access memory.

4. The memory as recited in claim 1 wherein said graphics primitive logic comprises a plurality of control registers, wherein said plurality of control registers are programmable using said logic command signal and a plurality of predetermined addresses; wherein said control registers store an indication of a selected one of several predetermined graphics operations which will be performed by said graphics primitive logic.

5. The memory is recited in claim 1 wherein said memory array and said graphics primitive logic are configured onto a single inline memory module.

6. The memory is recited in claim 5 wherein said memory array comprises a plurality of dynamic random access memory modules.

7. The memory as recited in claim 6 wherein said command is received by said single inline memory module via said logic command signal provided in addition to a standard single inline memory module control signal set.

8. The memory as recited in claim 7 wherein said graphics primitive logic comprises a plurality of control registers programmable using said logic command signal and a plurality of predetermined addresses; wherein said control registers store an indication of a selected one of several predetermined graphics operations which will be performed by said graphics primitive logic.

9. The memory as recited in claim 1 wherein said predetermined operation comprises anti-aliasing.

10. The memory as recited in claim 1 wherein said predetermined operation comprises shading.

11. The memory as recited in claim 1, wherein said logic command signal is indicative that a particular read or write operation is a graphics command.

12. A method for performing a predetermined operation upon a plurality of graphics primitives in a computer system, the method comprising:

storing said plurality of graphics primitives into a memory array within a memory bank; wherein a plurality of memory banks are comprised within a memory; wherein each of said plurality of memory banks includes a graphics primitive logic;

transmitting a command signal in addition to a standard memory control signal set to said memory bank subsequent to said storing via one of a plurality of conductors coupled to each of said plurality of memory banks, wherein said logic command signal is indicative of said predetermined graphics operation; and responsive to said logic command signal, iteratively performing said predetermined operation upon said plurality of graphics primitives by said graphics primitive logic.

13. The method as recited in claim 12 wherein said predetermined operation comprises anti-aliasing.

14. The method as recited in claim 12 wherein said predetermined operation comprises shading.

15. The method as recited in claim 12 wherein said memory and said graphics primitive logic are integrated into a dynamic random access memory, and wherein said logic command signal is in addition to a set of dynamic random access memory control signals.

16. The method as recited in claim 12 wherein said memory and said graphics primitive logic are integrated onto a single inline memory module, and wherein said logic command signal is conveyed from said conductor upon said single inline memory module to said graphics primitive logic.

17. The method as recited in claim 12 wherein said graphics primitive logic comprises a plurality of control registers, the method further comprising programming said plurality of control registers using said logic command signal; wherein said control registers store an indication of a selected one of several predetermined graphics operations which will be performed by said graphics primitive logic.

18. The method as recited in claim 12 further comprising transferring said plurality of graphics primitives to a graphics controller within said computer system subsequent to said iteratively performing.

19. A computer system comprising:
    a microprocessor;
    a bus bridge coupled to said microprocessor; and
    a memory including a plurality of memory banks, wherein each of said plurality of memory banks comprises:
        a memory array for storing data;
        a graphics primitive logic coupled to said memory array, said graphics primitive logic configured to perform a predetermined operation upon a plurality of graphics primitives stored in said memory array, said graphics primitive logic configured to iteratively perform said predetermined operation upon said plurality of graphics primitives responsive to a command conveyed by said microprocessor subsequent to said microprocessor storing said plurality of graphics primitives into said memory array;
        wherein each of said plurality of memory banks is coupled to a plurality of conductors, wherein one of the plurality of conductors conveys a logic command signal indicative of said predetermined graphics operation in addition to a standard memory control signal set.

* * * * *

UNITED STATES PATENT AND TRADEMARK OFFICE
CERTIFICATE OF CORRECTION

PATENT NO. : 6,097,403

DATED : August 1, 2000

INVENTOR(S) : Brian D. McMinn

It is certified that error appears in the above-identified patent and that said Letters Patent is hereby corrected as shown below:

Column 12, line 6, insert --logic-- after "transmitting a"

Signed and Sealed this

Twenty-fourth Day of April, 2001

Attest:

NICHOLAS P. GODICI

Attesting Officer

Acting Director of the United States Patent and Trademark Office